March 11, 1930. W. FRIEDRICHS 1,750,399
FRANKING MACHINE
Filed Dec. 22, 1928

Inventor:
Wilhelm Friedrichs
By Knight Bro
Attorneys

Patented Mar. 11, 1930

1,750,399

UNITED STATES PATENT OFFICE

WILHELM FRIEDRICHS, OF BERLIN, GERMANY

FRANKING MACHINE

Original application filed August 8, 1922, Serial No. 580,450. Divided and this application filed December 22, 1928. Serial No. 327,907.

This invention relates to improvements in franking machines of the kind provided with a drum for applying the franks of various value, the printing members for the various values (for instance types mounted upon a type carrier) being arranged within the drum. The invention relates especially to the adjusting device for the type carrier.

The present application is a division of my copending application Serial No. 580,450, filed August 8th, 1922.

In the accompanying drawing which illustrates a preferred form of the invention—

Figure 1:
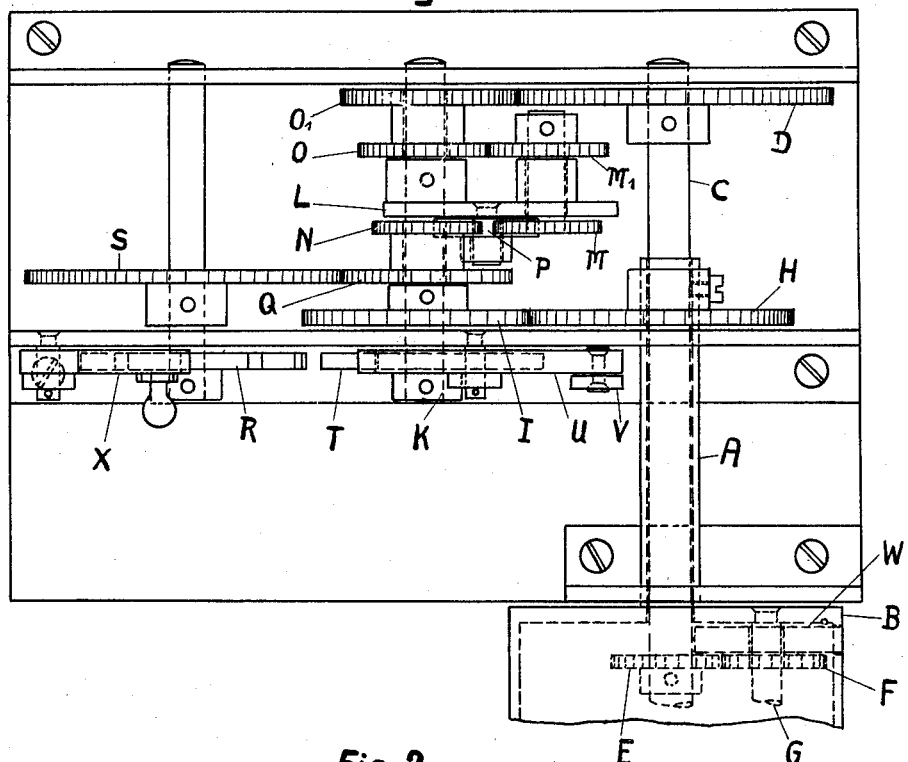
Figure 2:
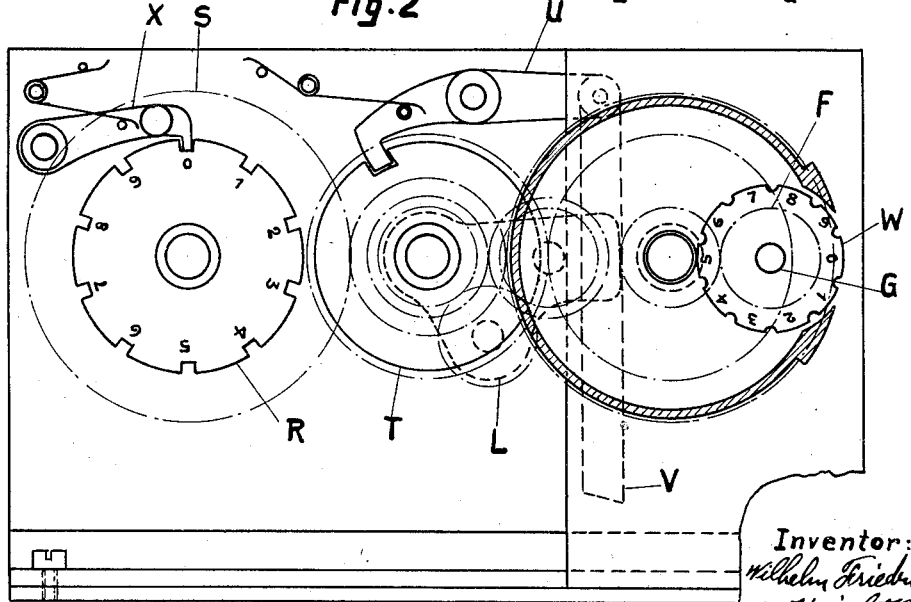

Fig. 1 is a plan view of the device,

Fig. 2 an end view of the same.

In this form of construction a printing device B, in the form of a hollow drum, is keyed upon a hollow driving shaft A. In the drum B is revolubly mounted a shaft G having fixed upon it a type carrier W, in the form of a wheel, having types of various values on its periphery. Within the hollow shaft A is loosely mounted a shaft C, having fixed to its outer end a toothed wheel D. Within the drum B there is fixed upon the shaft C a pinion E, which is in mesh with a pinion F fixed to shaft G. This mechanism serves for transmitting adjustments to the type carrier from a setting device described below.

On the hollow shaft A is secured a toothed wheel H, which is in mesh with a driving wheel I. The latter receives a driving motion from the crank or motor by which the machine is driven, through the intermediary of an automatically controlled coupling. The driving wheel I is fixed upon a shaft K, to which is also secured a locking disk T having a notch T' in which engages a pawl U controlled by a rod V. The rod V is controlled by a feeler (not shown) operated by the insertion of a letter. The operation of the feeler causes the motor to be coupled to drive the gear I and the pawl U to be raised from the notch T', to release the locking disk T.

Upon the shaft K are loosely mounted a rigidly connected pair of toothed wheels N, Q and a second rigidly connected pair of toothed wheels O, O'. Wheel O' is in mesh with the toothed wheel D, while the wheel Q is in mesh with a setting wheel S rigidly connected with a setting disk R. The disk R has notches around its periphery, with which a spring pressed pawl K is adapted to engage, to lock the setting disk and wheel. Between the toothed wheels N and O, there is fixed to the shaft K an arm L, bearing at its end two rigidly connected, rotatably mounted toothed wheels M, M'. The planet wheel M is connected by an intermediate wheel P with the sun wheel N, while the wheel M meshes directly with the wheel O. The ratio of transmission from wheel S to wheel Q is 2:1; the ratio of transmission from O' to D is 1:2; the ratio of transmission of all the other intermediate wheels is 1:1. The operation of the device is as follows:—

Assuming that the driving shaft A is at rest and that the type wheel W has to be adjusted, pawl X is lifted out of the notch of the adjusting disk R which can be now adjusted to the desired figure. The movement of the adjusting disk R is transmitted by toothed wheel S to toothed wheel Q in the movement of which the sun wheel N participates. This movement is further transmitted by the intermediate wheel P, planet wheels M, M' and toothed wheels O, O' to the toothed wheel D and consequently by the toothed wheels E and F to the type wheel W.

In view of the ratio of transmission stated above, the type wheel W will be turned through the same angle as the adjusting disk R.

Now, if the disk T is unlocked, when the printing device B is revolved by the motor, through the intermediary of toothed wheels, I, H and shaft A the planet wheels M, M' will revolve around axle K with the same speed at which wheel I revolves, as the arm L which carries these planet wheels is rigidly connected with said axle K. As the adjusting disk R is locked by pawl X the sun wheel M which is connected with the adjusting disk through the intermediary of the wheels Q and S will remain stationary during this movement. Owing to the rotation of the planet gear, wheels O, O' are driven from the planet gear at an angular speed which is twice as great as the angular speed of the toothed wheel I. As, however, the ratio of transmission between O' and D is=1:2 the toothed wheel D will be driven at the same angular speed as toothed wheels I, and H, which are of equal size, the movement of toothed wheel D being exactly the same as if this toothed wheel were keyed upon the driving shaft A. Consequently any displacement of the type wheel W is excluded.

Having described my invention, I claim:

1. In a printing device, a rotatable drum, a type carrier adjustably mounted in said drum, a gear for rotating said drum, a gear for adjusting said type carrier in said drum, a setting mechanism, means for locking said setting mechanism, and a planet gear connecting said drum rotating gear and said setting mechanism to said type carrier adjusting gear, the arrangement being such that said type carrier is freely adjustable by said setting mechanism, while the turning of said drum rotating gear causes the simultaneous rotation of said type carrier adjusting gear to maintain said type carrier in a fixed relation to said drum.

2. In a printing device, a rotatable drum, a type carrier adjustably mounted in said drum, a gear for rotating said drum, a gear for adjusting said type carried in said drum, a setting mechanism, means for locking said setting mechanism, a planet gear consisting of a sun wheel member, an arm member, and a planet wheel member rotatably mounted upon said arm member and geared to said sun wheel member, a connection between said setting mechanism and one of said members, a connection between said drum rotating gear and another of said members, and a connection between said type carrier adjusting gear and the third of said members, the arrangement being such that said type carrier is freely adjustable by said setting mechanism, while the turning of said drum rotating gear causes the simultaneous rotation of said type carrier adjusting gear to maintain said type carrier in a fixed relation to said drum.

In testimony whereof I affix my signature.

WILHELM FRIEDRICHS.